Patented Oct. 17, 1950

2,525,789

UNITED STATES PATENT OFFICE 2,525,789

STAINING METHOD OF DETECTING HIDDEN WEEVIL INFESTATION IN GRAINS

Justus C. Frankenfeld, Manhattan, Kans., dedicated to the free use of the People in the territory of the United States No Drawing. Application May 17, 1949, Serial No. 93,814

4 Claims. (Cl. 73—432)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

I hereby dedicate the invention herein described to the free use of the people in the territory of the United States to take effect on the granting of a patent to me.

This invention relates to staining methods for detecting weevil infestation in grain and has among its objects the provision of such methods which are simple, practical, and inexpensive, and which enable a substantially pure grain to be obtained. Other objects will be apparent from the description of the invention.

The eggs and immature stages of the rice weevil and the granary weevil (Sitophilus oryza (L.) and S. granarius (L.)) hidden within the kernels of wheat, corn, or other grain are invisible to the naked eye and cannot be detected by ordinary inspection methods. Thus, grains that grade No. 1 may actually have a high percentage of infested kernels. If this grain is used for milling, the different stages of the weevils, together with the cast skins and excrement, will be ground up in the milling process, and the finished flour or meal will thus be contaminated with the fragments. In order that the miller may produce a pure product, it is imperative that he know the condition of the grain which he is grinding. So far as the miller is concerned, it matters little whether the infestation in the grain is alive or dead or what stages are present, since any stages of the weevils from egg to adult, whether living or dead, will contaminate the finished product. A miller may therefore buy a No. 1 grade grain which apparently is free of infestation because of fumigation and cleaning methods applied prior to its arrival at his mill, but which may, nevertheless, be heavily infested with immature stages of weevil hidden within the kernels.

In depositing her egg the female weevil first drills a tiny cavity into the surface of the grain kernel. After depositing her egg in this cavity, she seals the opening with a gelatinous secretion which hardens and serves as a protective plug. This egg-plug remains on the grain throughout the development of the immature stages, and, unless removed by the emerging adult weevil, will remain on the infested grain indefinitely.

In general, the invention involves a method of treating grain, such as wheat, corn, and sorghum, to detect hidden weevil infestation therein, as evidenced by the presence of weevil egg-plugs. In this method, the grain to be tested is completely immersed in an aqueous dye solution containing a dye having an affinity for the egg-plugs, such as acid fuchsin and Lugol's solution, for a short period of time, after which the resulting treated grain is separated from the dye solution and washed to remove excess dye solution. If egg-plugs are present, they will be stained a deep color characteristic of the dye used, thereby indicating that the kernel is infested. This method will indicate weevil infestation no matter what stages of the weevils are present.

Of the two dyes listed above, it is preferred, because of its decided advantages, to utilize the acid fuchsin dye solution which is prepared as follows:

Acid fuchsin, 0.5 gm.
Glacial acetic acid, 50.0 cc.
Distilled water, 950.0 cc.

The distilled water and glacial acetic acid are mixed to form a solution and the acid fuchsin is added thereto and dissolves readily therein. Care should be taken not to confuse acid fuchsin with basic fuchsin which is entirely different in its action and is not suitable for detecting weevil infestation in grain.

It is not necessary to prepare fresh solutions of acid fuchsin. If desirable, any quantity may be prepared at one time, stored, and used as needed without loss in efficiency. The same solution may also be used a number of times without losing its efficiency. If after prolonged usage, however, the solution tends to become murky, it should be discarded.

In using the acid fuchsin dye, the sample of grain to be tested should be placed in a suitable container, preferably a shallow dish large enough to adequately hold the sample and the acid fuchsin dye solution. Enough of the solution should be used to immerse the kernels completely. The grain is left in this solution for about from two to five minutes. If left in the solution for a longer period, the kernels will absorb enough of the solution to color them slightly, thus making it more difficult to locate the egg-plugs. If the grain is permitted to soak in warm water for about five minutes before treating, less staining of the kernels results without impairing the staining of the egg-plug. The water should be poured off before adding the fuchsin solution.

After the grain has been immersed in the fuchsin dye solution for from two to five minutes, the dye is poured off and the grain is washed in tap water until all of the excess dye has been removed. The grain may then be examined under water or drained and spread on a glass plate or similar surface for examination. The acid fuchsin stains the gelatinous egg-plugs a deep cherry red, whereas feeding punctures and mechanical injury are stained a light pink color. The egg-plugs are about the size of an ordinary pin prick and are readily seen with the naked eye, but the use of a reading glass is helpful in finding them.

Besides staining the weevil egg-plugs this dye will also stain weevil feeding injury, as well as entrance and exit holes of the lesser grain borer. These are stained a lighter color, however, and can therefore be easily differentiated from weevil egg-plugs. Mechanical injuries, as a result of threshing and subsequent handling of the grain, will also be stained. However, they may be easily distinguished from the egg-plugs by their shape, size, and lighter color. Insect feeding injuries are round and smooth in outline, while mechanical injuries are very irregular. Grain that has passed through cleaning machinery, such as scourers and disc separators, prior to milling, frequently bears injuries which greatly resemble the feeding injuries of weevils and grain borers. It is practically impossible to differentiate these two types of injury. However, the miller who wants to know whether or not the grain contains weevil infestation can find this out by using the stain on samples of the grain before it is run through the cleaning machinery, thus avoiding any confusion in distinguishing weevil egg-plugs and weevil or grain borer feeding injuries from mechanical injuries.

The proportion of weevil egg-plugs to feeding punctures will depend largely upon (1) the number of adults to which the grain has been exposed and (2) the condition of the grain, particularly as to moisture content. Apparently the adult weevils feed upon the endosperm of the grain kernel in the process of drilling the cavities in which they lay their eggs. Thus, unless the weevils are disturbed, eggs are usually deposited in all cavities that the adults drill into the kernel. If the populations are very large, many punctures may be found which do not contain eggs. This is due to the fact that the female weevil was disturbed while drilling the egg cavity and did not return to deposit the egg. This is not believed to be a significant factor, however, for in all such cases encountered there were always one or more egg-plugs in addition to the egg-free punctures.

If the moisture content of the grain is comparatively low, that is, 11 percent or less, the female weevil may drill a cavity, but, finding conditions unsuitable, will not deposit an egg. Such grain will generally have a comparatively high percentage of egg-free punctures. In numerous dissections of kernels that had been treated with this dye to locate the egg-plugs, weevil eggs were found under every plug. The female weevil does not seal the cavity in the kernel unless she has deposited an egg. By actual count, between 85 and 90 percent of all eggs laid hatch. With moisture and temperature conditions remaining favorable, all larvae hatching complete their development.

Since this dye stains the weevil egg-plug, it is suitable for determining weevil infestation in wheat, corn, and sorghum grains. Fifteen varieties of hard and soft wheat have been tested, on all of which the egg-plugs could be readily detected.

Weevil egg-plugs may be readily distinguished from the eggs of other species of grain-infesting insects because all other species lay their eggs loose among the kernels, in larger feeding cavities in the kernels or in floury material mixed with the grain.

The other dye solution which can be used is commonly known as Lugol's solution and is prepared from the following ingredients:

Iodine, 1 gm.
Potassium iodide, 2 gm.
Distilled water, 900 cc.

The potassium iodide is dissolved in the distilled water and the iodine then added. The iodine may be more readily dissolved by heating the solution over a low flame with occasional stirring. This dye, commonly used as a test for starch, stains the egg-plugs a dark purple color due to the fact that small particles of starchy endosperm adhere to the gelatinous egg-plug. It also stains the exposed endosperm resulting from insect feeding or mechanical injury. It has the disadvantage, however, of not staining the egg-plugs located in the germ of the grain, nor is it adaptable to corn or sorghum. Furthermore, it also stains small particles of endosperm on the surface of the grain which are easily confused with the similarly shaped egg-plugs.

In general, the method used is the same as for the fuchsin dye except that ten minutes are required to obtain maximum staining. A fresh iodine solution should always be used because it quickly loses its efficiency upon standing. It is also important to examine the grain shortly after staining because the color gradually decreases in intensity when exposed to the air.

Having thus described the invention, what is claimed is:

1. A method of treating grain to detect hidden weevil infestation therein as evidenced by the presence of weevil egg-plugs, comprising completely immersing the grain in a solution containing a dye having an affinity for the egg-plugs for a short period of time, separating the resulting treated grain from the dye solution, and washing the treated grain to remove the excess of the dye solution, said washed grain having the egg-plugs, if present, stained a deep, dark color which is characteristic of the dye used.

2. A method of treating grain to detect hidden weevil infestation therein as evidenced by the presence of weevil egg-plugs, comprising completely immersing the grain in an aqueous dye solution containing acid fuchsin and glacial acetic acid for a period of about from two to five minutes, separating the resulting treated grain from the dye solution, and washing the treated grain to remove the excess of the dye solution, said washed grain having the egg-plugs, if present, stained a deep, cherry red.

3. A method of treating grain to detect hidden weevil infestation therein as evidenced by the presence of weevil egg-plugs, comprising soaking the grain in warm water for a period of about five minutes, separating the grain from the water, completely immersing the grain in an aqueous dye solution containing acid fuchsin and glacial acetic acid for a period of about from two to five minutes, separating the resulting treated grain from the dye solution, and washing the treated grain to remove the excess of the dye solution, said washed grain having the egg-plugs, if present, stained a deep, cherry red.

4. A method of treating grain to detect hidden weevil infestation therein as evidenced by the presence of weevil egg-plugs, comprising completely immersing the grain in an aqueous dye solution containing iodine and potassium iodide for a period of about ten minutes, separating the resulting treated grain from the dye solution, and washing the treated grain to remove the excess of the dye solution, said washed grain having the egg-plugs, if present, stained a dark purple.

JUSTUS C. FRANKENFELD.

No references cited.